Oct. 18, 1932.  O. U. ZERK  1,883,282
LUBRICATING APPARATUS
Filed April 26, 1930
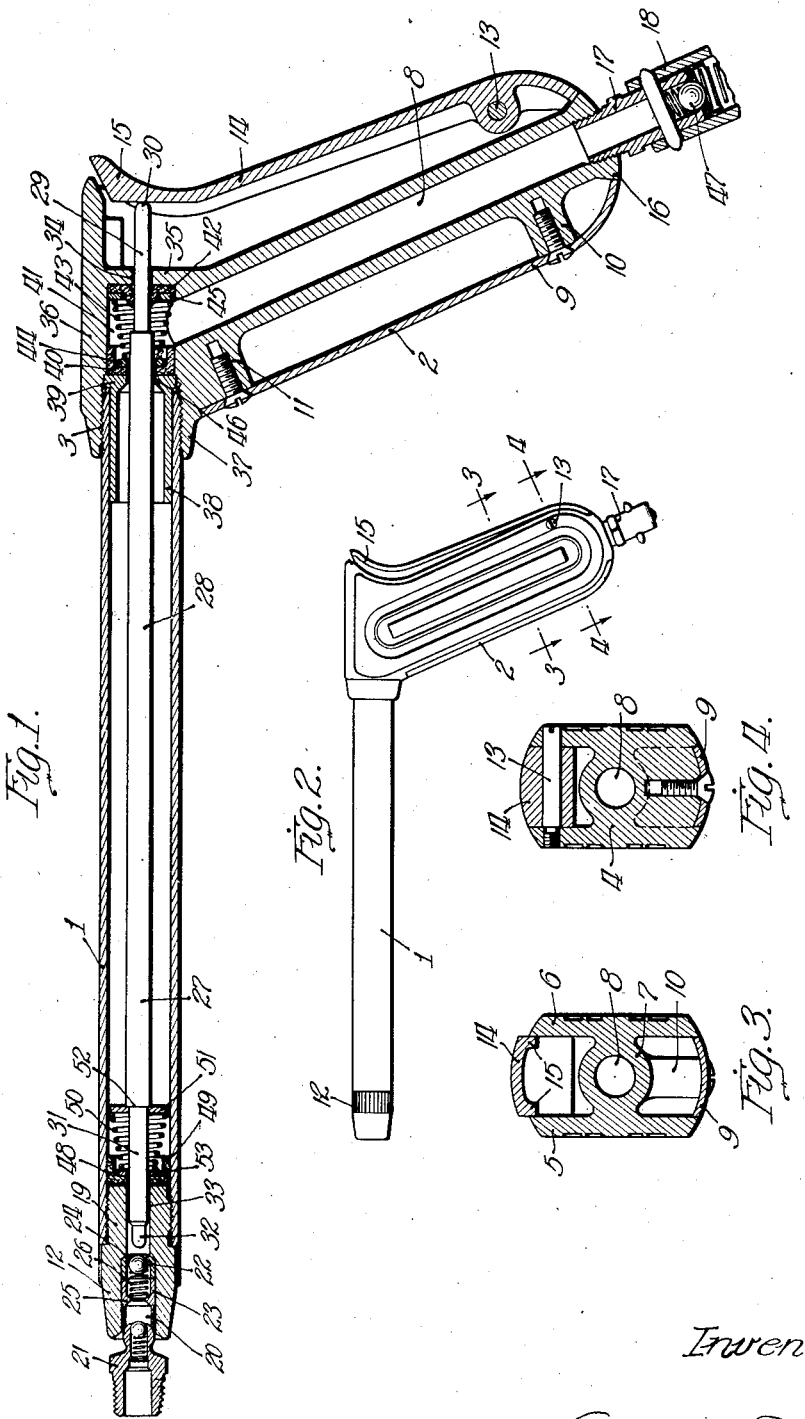
Inventor:
Oscar U. Zerk Patented Oct. 18, 1932

1,883,282

UNITED STATES PATENT OFFICE

OSCAR U. ZERK, OF CHICAGO, ILLINOIS, ASSIGNOR TO ALEMITE CORPORATION, OF CHICAGO, ILLINOIS, A CORPORATION OF DELAWARE

LUBRICATING APPARATUS

Application filed April 26, 1930. Serial No. 447,527.

My invention relates generally to lubricating apparatus for servicing bearings and relates more particularly to lubricating apparatus involving appliances adapted for use at service stations for the purpose of interchangeably providing the lubricant receiving nipples, individually associated with bearings of a mechanism, such as an automobile chassis, with a supply of lubricant under pressure.

Nipples commonly employed for communicating lubricant to the bearing surfaces of bearings of an automobile chassis, or other mechanism, are commonly of two distinct types, namely, the interlocking type employing separable, rigidly interlocking, lubricant dispensing nozzle and lubricant receiving nipple coupler elements, and secondly, the contact type wherein lubricant sealing engagement between a lubricant dispensing nozzle and a lubricant receiving nipple is manually maintained during the lubricating operation by manual force exerted longitudinally of the nozzle to effect pressure engagement between cooperating contacting surfaces of the nozzle and nipple.

My present invention although not limited thereto, has a more particular application to the contact type of lubricating apparatus, such as is exemplified in my United States Patent No. 1,748,819, issued February 25, 1930, and in my co-pending application United States Letters Patent, Serial No. 430,720, filed February 24, 1930, wherein a resilient tubular metallic nozzle element is employed to effect a lubricant tight contacting engagement with a lubricating nipple from any one of a plurality of different angular directions.

In the lubrication of the chassis bearings of automobiles, and the like, at service stations where lubrication service is rendered, lubricating mechanisms are commonly installed which in general comprise a relatively long lubricant dispensing hose of special construction to adapt it to convey lubricant under high pressure from a source, generally a motor operated or air pressure operated compressor.

From the compressor lubricant is conveyed under pressure, by a hose, to a terminal lubricant dispensing nozzle which is adapted for interchangeable application to nipples individually associated with the bearings; a manually operable valve is usually interposed in the hose line near the nozzle, to control the flow of lubricant from the nozzle.

My invention is also applicable to systems employing other types of high pressure lubricant pumps, preferably of the portable type, which, mostly, are manually operated. In the manually operable type of pump a separate manually operable valve interposed in the hose line is not necessary because these pumps eject a measured amount of lubricant, only, when manual force is applied.

Service station lubricating mechanisms of these types are now in general use. They include a nozzle of the interlocking type attached to the end of a flexible hose.

Due to the fact that a large number of cars are equipped with the interlocking type of lubricant receiving nipples and a still larger number of cars with the contact type of nipples and because most of the greasing apparatus of service stations are still equipped with the older interlocking type of coupling and because the interlocking type of coupling does not fit the contact type of nipple, so called "adapters" are commonly used which will permit a car equipped with the contact type of nipples to be lubricated with a greasing station outfit equipped with the interlocking type of coupling.

These adapters usually consist of an interlocking nipple, a tubular extension of the straight or elbow type and a nozzle of the contact type. Adapters of this kind are disclosed in my co-pending applications for United States Letters Patent, Serial No. 399,965 filed October 16, 1929 and Serial No. 438,918 filed March 26, 1930.

Adapters of this prior type are objectionable since whenever a contact system is used it is imperative that sufficient pressure is exerted between nozzle and nipple to create a leakproof contact. In order to maintain this leakproof contact, means must be employed which will facilitate the easy application of manual pressure.

Grease guns of the contact type are equipped with pistol grip handles so designed that the minimum amount of pressure may be exerted against the sensitive palm of the hand. Without such a pistol grip it is very difficult to maintain the necessary pressure between nozzle and nipple.

The lubricant adapter of my present invention is of the same general type as my adapter described in application Serial No. 438,918, and designed for the same general purpose, and employs a similar pistol grip handle.

Lubricating adapters have been designed in such a manner that the nozzle of the adapter is carried by a hollow cylinder which telescopes into another cylinder and over a piston, when the adapted is pressed against a nipple. On account of the necessity of making the adapter of robust construction, to withstand the rough usage to which it is subjected in public garages and service stations, the telescoping portion of the hollow cylinder carrying the nozzle is required to be of relatively large diameter. The larger the diameter of this hollow cylinder, the greater is the manual pressure which has to be exerted against the adapter to cause the pressure of lubricant to effect opening of the check valve usually provided.

In my present invention I do away with a nozzle supporting telescoping cylinder, and connect the nozzle rigidly to the adapter tube which in turn is again rigidly connected to the adapter handle.

An object of my invention therefore, is to reduce the back pressure required to open the check valve in the adapter, to a minimum.

Another object of my invention is to provide an adapter of rugged construction having the nozzle and adapter, rigidly joined together.

Another object of my invention is to provide improved manually operable means to open the check valve in the adapter which is operated as an automatic incident to the ordinary operation of pressing the nozzle against the nipple which at the time is being served.

Another object of my invention is to provide improved trigger operable means at the rear end of the pistol grip handle, for opening the check valve of a dispensing apparatus of the above general character.

Another object of my invention is to provide an improved trigger equipping handle especially applicable to lubricating apparatus.

Another object of my invention is to provide an improved handle means for lubricating apparatus wherein a trigger blade is disposed in such a manner that the same is substantially flush with the rear end of the pistol grip when the trigger blade is at the end of the manually effected movement.

Another object of my invention is to provide an improved lubricating apparatus wherein by improved means the escape of lubricant under pressure, is prevented during use and during periods of disuse of the apparatus.

Another object of my invention is to provide improved manually controlled automatically operable means for operating a dispensing valve of apparatus of the type above referred to.

Another object of my invention is to provide for achieving each and every one of the aforesaid objects in a mechanism not requiring the use of an actuating fluid requiring additional apparatus for placing it under pressure to operate the valve of my improved apparatus.

Other objects of my invention and the invention itself will become more apparent from the following description of an embodiment of my invention wherein reference is had to the accompanying drawing illustrating said embodiment.

Referring to the drawing:

Fig. 1 is a longitudinal medial sectional view of a lubricant dispensing terminal apparatus for service stations for interchangeably servicing bearings of mechanisms such as automobiles, through nipples individually secured thereto, and which is adapted to receive lubricant under pressure through a hose from a source of lubricant;

Fig. 2 is a side elevational view of the apparatus of Fig. 1;

Figs. 3 and 4 are transverse sections taken respectively on the lines 3—3 and 4—4 of Fig. 2;

Referring now to all of the above figures of drawing, in each of which parts appearing in more than one figure, are designated by like reference characters, the apparatus of my invention essentially comprises a lubricant dispensing tubular barrel 1, supporting anteriorly a tubular nozzle 12 and a handle 2 therefor posteriorly affixed thereto, preferably by screw-threading an end of the barrel into an interiorly threaded opening of the handle 3.

While the handle may be variously formed, I sometimes construct it as illustrated in the drawing, wherein a skeleton frame 4, which in the transvere section illustrated in Fig. 3 is approximately H-shaped, provides a pair of approximately parallel rigid sides 5 and 6 of a handle of the pistol grip type, which are integrally connected by a transverse web or bridge 7 extending longitudinally of the handle between the sides and which web is provided with a longitudinal bore 8 for passage of lubricant through the handle.

The sides 5 and 6 are also joined at their upper ends by an integrally formed bridge 36, and an apertured web 35 interconnects the upper end of the bridge 7 thereto interiorly of the handle, said bridge 7 and bridge 36 together forming a tubular outlet 37 therefor, into which the barrel 1 is screw-threaded at 3.

The forward face of the handle, shown at 9, is of sheet metal and is transversely convexly curved and is secured to and supported by lugs 10 and 11 integrally forwardly projecting from the bored bridge 7 of the frame. The posterior wall of the handle grip comprises a plate 14 transversely convexly rounded forming a valve operating lever, being pivoted near its lower end on a pin 13 which is carried by and bridges the rearwardly extending portions of the handle frame arms 5 and 6 near the bottom end of the handle, said lever plate 14 being provided with lateral flanges 15 extending between the arms 5 and 6.

By virtue of the provision of the sheet metal closure plate 9 at the front of the handle and the hinged plate 14 at the rear of the handle, the handle is substantially closed on all sides and the plates 9 and 14 being exteriorly convexly rounded is formed to be comfortably gripped by the hand of the operator of the apparatus.

The free end of the plate 14 is outwardly turned at 15, for engagement by the fleshy part of the operator's hand between the thumb and index fingers when the handle is grasped.

The bridge 7 protrudes between the plates 9 and 14 by an enlarged end 16 against the front and rear lateral surfaces of which, the lower ends of the plates contact. A lubricant receiving nipple 17 screwthreaded into the enlarged lower end 16 of the bridge 7 is adapted for interlocking lubricant communicating engagement with a nozzle element 18 carried on the end of a lubricant dispensing hose, not shown, for the purpose of communicating lubricant to the interior bore 8 of the handle and from thence, as will be described, to the dispensing tube 1 of my improved dispensing apparatus.

The nozzle 12 is of tubular form and is provided with a reduced stem 19 which is screw-threaded into the forward end of the tubular barrel 1, which is preferably of small diameter relative to the barrels of grease guns commonly previously employed in practice, and is provided with a tubular resilient lubricant dispensing contactor 20 preferably of the general type disclosed in my prior Patent No. 1,748,819, and my co-pending application, Serial No. 430,720, filed February 24, 1930, and is adapted to effect a lubricant tight contacting engagement with the exterior surface of the inlet tip of a lubricating nipple, such as that shown at 21, against which the contactor is pressed, and a portion of which is incidentally partially received within the contactor.

The nozzle 12 is also provided with an interiorly disposed valve ball 22 carried within a tubular valve chamber 23 preferably integrally formed with the contactor 20 and providing a valve seat 24 and spring engaging abutment 25 by inwardly extending flanges, the spring 26 being interposed between the valve ball and the flange 25 to press the ball to its seat.

The valve so provided is of the check valve type, except that the spring 26 is made of wire of sufficient diameter that it will resist displacement of the ball 22 from its seat 24 for all pressures of lubricant exerted on the approach side of the ball against its surface exposed towards such side, it being intended by the apparatus provided herein that the valve 22 shall be capable of being reseated by the power of the spring 26 even against the pressure of lubricant exerted thereon after the valve has been unseated to dispense lubricant through the contactor 20 into the nipple 21 to lubricate a bearing served by the nipple.

To unseat the valve ball 22 to dispense lubricant from the nozzle, a longitudinally reciprocable rod 27 is positioned axially in the barrel 1 and comprises a relatively long intermediate portion 28 of full diameter, a posteriorly disposed actuating tip 29 of reduced diameter whose end bears against the inner surface of the pivoted plate 14 at 30, and a forwardly disposed reduced tip portion 31 also of reduced diameter which terminates in a short valve engaging tip 32 of still smaller diameter. The diameter of the valve engaging tip 32 is such that it may loosely enter the interior of the valve chamber through the flange 24 forming the valve seat at the same time pushing the valve ball 22 from its seat against the pressure of the seat 26, when the rod is moved longitudinally forward by manual pressure exerted against the posterior outer surface of the lever plate 14.

The rod 28 is guided by the tip portions 29 and 31 which respectively fit within the walls of the bore 33 of the nozzle stem 19, and the walls of the aperture 34 of a web 35 which is a projection of the bridge 7 of the handle frame.

A tubular element 38 having a flanged end 39 is projected into the posterior end of the tube 1 being preferably press-fitted therein and provides by its outer end surface a seat for a cup leather packing 40 provided for the purpose of preventing leakage of lubricant under pressure, communicated by the handle bore 8 to the intermediate lubricant chamber 41 of the handle, along threads 3 of the tube 1. A second cup leather packing 42 is provided about the reduced end 29 of the rod 28 to prevent leakage of lubricant along the surface of the rod from the chamber 41 and a spiral spring 43 is interposed between opposing surfaces of the two packings to hold them firmly in place, suitable washers 44 and 45 at the two ends of the spring transmitting the pressure thereof to the packings to hold them to their seats. The head flange 39 of the tubular element 38 and the cup leather packing 40 provide axially aligned lubricant receiving openings 46 to communicate lubricant received by the chamber 41 from the bore 8, to the interior of the tubular element 30 and from hence it passes into the barrel 1.

The apparatus of my invention operates as follows: The lubricant dispensing nozzle assumed to be of the interlocking type as shown at 18 and moreover assumed to be affixed to the end of a lubricant dispensing flexible tube which leads from a source of lubricant under pressure, and preferably high pressure such as two thousand pounds per square inch is coupled to the fitting 17. Lubricant will be supplied past the check valve 47 of the inlet nipple 17 into the barrel 1, through the intercommunicating passage provided by the bore 8 of the handle bridge, intermediate chamber 41, the aligned apertures of the washer 44, cup leather packing 40 and flange 39 of the tube 38 and said tube.

With the parts in the position shown, lubricant will not pass from the tube 1 forming the dispensing barrel, being restrained therein by the valve ball 22 which makes a spring pressure maintained lubricant sealing contact with the valve seat 24, the pressure of the spring 26 as before related being sufficient to withstand the pressure of lubricant exerted on said valve ball from its approach side.

When, however, the dispensing unit above described, is brought into contact with a nipple 21, with the tubular contactor 20 making leak proof engagement therewith, the operator grasping the handle 2 forces the barrel 1 longitudinally towards the nipple to maintain the sealed contact between the contactor and nipple inlet element, and by pressure engagement of his hand against the hinged plate 14, will effect an unseating of the valve 22 by a forward movement of the free end 15 of the plate 14 about its fulcrum pin 13 to thrust the rod 28 forwardly from its position as shown, to a position whereat the tip 32 will have unseated the valve ball 22. Such an operation will open the passage through the nozzle to communicate lubricant to the interior of the contactor 20, since the stem 19 of the nozzle is provided with a bore greater than the diameter of the rod portion 31 which reciprocates therein.

A cup leather packing 48 fitted against the end of the nozzle stem and having its tubular lubricant sealing flange 49 in engagement with the adjacent interior walls of the barrel 1, prevents leakage of lubricant along the surfaces of the interengaging threads of said stem and barrel. A compression spring 50 held in compression between a washer 51, fitted against the shoulder 52 of the rod 28 and a washer 53 fitted against the interior of the radial flange of said cup leather, furnishes the retractile effort to restore the rod to the position illustrated relative to the rest of the apparatus and incidentally to restore the rod 28 and plate 14 to the positions illustrated, relative to the rest of the apparatus shown.

Incidentally, the washer 51 is of less diameter relative to the interior bore of the tube, and the washer 53 has an aperture in excess of the diameter of the rod portion 31, so that these parts do not appreciably resist the passage of lubricant from the bore of the barrel 1 to the valve 22 during the operation of the device.

Since pressure of lubricant will be exerted against the end surface of the shoulder formed by the junction of the intermediate enlarged rod portion 28 and the actuating pin portion 29, the rod preferably is formed at the other end so that a larger portion of the end surface of the rod comprising the end of the valve actuating tip 32 receives the pressure of lubricant in the tube 1 which tends to force the rod 28 rearwardly.

The excess of area exposed to the pressure of lubricant preferably amounts to about .01 square inches, and if the pressure of lubricant exerted thereon is of the order of one to two thousand pounds per square inch, the rod will be pressed rearwardly with a force of from ten to twenty pounds, and in order to unseat the valve 22, besides overcoming the pressure of the spring 50, a manual effort will be required to be exerted on the actuating plate 14 in excess of ten or twenty pounds as the case may be.

Such a pressure will cause the contactor 20 to make such a pressure contact with the lubricant receiving tip of the nipple 21 that a good lubricant sealing contact will be effected before the valve 22 is opened to permit lubricant to be discharged through the contactor. Loss of lubricant is thereby prevented, and the same considerations ensure that the valve 22 will be promptly closed by prompt withdrawal of the rod 28 by the conjoint action of the spring 50 and the excess of fluid pressure exerted on the forward end of the rod.

During the lubricating operation also, the manual pressure required to maintain the rod in its actuated positon will be proportional to the fluid pressure exerted within the contactor, tending to separate the contactor and lubricant receiving nipple, whereby the manual effort will always be sufficient to prevent such operation and leakage of lubricant.

Having thus described my invention in a specific embodiment, I am aware that my invention may be embodied in lubricating apparatus varying widely from that herein illustrated and described, but without departing from the spirit of my invention.

I claim:

1. A lubricant dispensing apparatus, comprising a tubular dispensing barrel, a posteriorly disposed handle therefor, a tubular dispensing nozzle rigidly mounted on the forward end of the barrel, a valve in the barrel, a spring closing the valve against pressure of lubricant in the barrel, a thrust rod in the barrel for unseating the valve, and means forming a part of the handle, adapted to move the rod to unseat the valve, solely by a manual thrust effort exerted upon the handle towards the free end of the barrel communicated to the valve by said rod.

2. A lubricant dispensing apparatus, comprising a tubular dispensing barrel, said barrel terminating anteriorly in a contact type nozzle, a posteriorly disposed handle therefor, a valve in the barrel, a spring closing the valve against pressure of lubricant in the barrel, a thrust rod in the barrel for unseating the valve, and means forming a part of the handle, adapted to move the rod to unseat the valve, solely by a manual thrust effort exerted upon the handle towards the free end of the barrel communicated to the valve by said rod, said rod including a surface area exposed to pressure of lubricant in the barrel to oppose actuation of said handle means.

3. A lubricant dispensing apparatus comprising a tubular dispensing barrel, a posteriorly disposed supporting handle therefor, an anteriorly disposed nozzle supported thereby, a valve controlling the flow of lubricant from the nozzle, said handle including an element movable responsive to a forwardly directed manual effort exerted on the handle toward the nozzle for unseating the valve, and means associated therewith exposed to pressure of lubricant contained in the apparatus for opposing actuation of said valve unseating means with a force approximately proportional to the fluid pressure of lubricant, whereby the forwardly directed effort required to unseat the valve will be in excess of that required to effect lubricant sealing contact between said nozzle and a lubricant receiving nipple engaged thereby.

4. A dispensing apparatus for centralized lubricating service stations comprising in combination with a source of lubricant under pressure and a flexible tube leading therefrom, an elongated dispensing tube, a contact type nozzle anteriorly, and a handle posteriorly affixed to the opposite ends of the tube, a valve controlling the discharge of lubricant from the nozzle and means responsive to a forwardly directed manual thrust on the handle adapted to unseat the valve, including an element responsive to fluid pressure of lubricant in the barrel adapted to oppose the operation of said valve unseating means.

5. A dispensing apparatus for centralized lubricating service stations comprising in combination with a source of lubricant under pressure and a flexible tube leading therefrom, an elongated dispensing tube, a contact type nozzle anteriorly and rigidly mounted on the tube, and a handle posteriorly affixed to the opposite end of the tube, a valve controlling the discharge of lubricant from the nozzle and means responsive to a forwardly directed manual thrust on the handle adapted to unseat the valve, including an element responsive to fluid pressure of lubricant in the barrel adapted to oppose the operation of said valve unseating means by a force in pounds in excess of that required to effect a lubricant sealing contact between said nozzle and a nipple to which the nozzle is adapted to be applied.

6. In lubricating apparatus, a tube, a handle affixed to one end thereof, a contact type nozzle rigidly affixed to the other end thereof, a valve normally closing the passage through the nozzle, a rod extending through the tube and responsive to a thrust on the handle towards the nozzle to open the valve.

7. A lubricant dispenser comprising rigidly joined tubular handle and barrel elements, a nozzle at the free end of the barrel, a lubricant coupling element at the free end of the handle, a valve adjacent said nozzle controlling the flow of lubricant therethrough and a movable section for said handle, disposed posteriorly thereof responsive to a forward thrust thereon to open said valve.

8. Lubricating apparatus comprising a tubular dispensing barrel, a piston grip handle therefor comprising an approximately H-shaped frame, a plate bridging corresponding ends of two of the parallel arms thereof rigidly affixed to the frame and a plate spanning the opposite parallel arm ends pivoted to the frame and disposed posteriorly of the handle, and a valve for controlling the flow of lubricant from the barrel actuatable responsive to movement of said pivoted plate.

9. A lubricating apparatus for dispensing lubricant continuously communicated thereto under pressure comprising a tube, a handle and dispensing nozzle separately and rigidly affixed to the two ends of the tube, a valve for the nozzle, and means responsive to a thrust on the handle to open the valve, manually movable means associated with the handle to open the valve and means associated with said movable means responsive to fluid pressure in the tube to oppose the actuation of said movable means.

10. In lubricating apparatus, a tube, a handle and a contact type nozzle affixed to the opposite ends thereof, a valve normally closing the passage through the nozzle, a rod extending through the tube rearwardly to the handle and responsive to a thrust on the handle towards the nozzle to open the valve, said rod having forwardly disposed surfaces exposed to the fluid pressure of lubricant in the tube tending to move the rod rearwardly to oppose manually exerted thrusts on said handle toward the nozzle.

11. A lubricant dispenser for a dispensing hose line of a high pressure lubricating system comprising angularly joined handle and barrel elements, a contact type nozzle at the free end of the barrel, a valve located adjacent the nozzle controlling the flow of lubricant therethrough, and a movable element forming part of said handle disposed posteriorly thereof responsive to a manual forwardly directed thrust thereon, and means extending through the barrel to communicate said thrust to said valve to open same.

12. A lubricant dispenser for a dispensing hose line of a high pressure lubricating system comprising angularly joined handle and barrel elements, a contact type nozzle at the free end of the barrel, a valve controlling the flow of lubricant through the nozzle and a movable element forming part of said handle disposed posteriorly thereof responsive to a manual forwardly directed thrust thereon to open said valve, and means exposed to the lubricant pressure to oppose forward movement of said movable element to intensify the contact pressure required to be communicated from the element to the nozzle to press it against a lubricant receiving nipple in order to open the valve.

13. A lubricant dispensing apparatus comprising a hand grip of the pistol type, a dispensing tube, extending obtusely angularly therefrom, said grip and tube having intercommunicating longitudinal extending passages, a lubricant receiving nipple at the free end of the grip for receiving lubricant communicated to its passage, a lubricant dispensing nozzle at the free end of the tube, a valve located in the forward end of the tube controlling the flow of lubricant through said nozzle, thrust means including an element disposed posteriorly of the handle adapted to be engaged by the hand of an operator grasping the handle, and means extending longitudinally of said barrel to open said valve.

14. In a lubricating apparatus, the combination with a dispensing barrel, a handle of the pistol grip type secured thereto, extending angularly therefrom, said hand grip comprising a frame providing a pair of hand grip sides and an interior web joining the intermediate portions of the sides, the web provided with a bore extending longitudinally of the handle communicating at one end with the interior of the barrel, a lubricant receiving nipple affixed to the free end of the handle adapted to receive lubricant from a source of lubricant under pressure and to communicate it to the barrel through the said web bore, and manually operable means to effect discharge of lubricant from the free end of the tube.

15. In a lubricant dispensing apparatus provided with a contact type dispensing nozzle, a movable thrust means therefor, for effecting the sealing contact between said nozzle and a nipple operatively associated therewith, a valve controlling the flow of lubricant through said nozzle adapted to be unseated responsive to movement of said thrust means, said thrust means comprising a portion exposed to pressure of lubricant in the apparatus opposing manually effected valve opening movement of said thrust means.

16. In a lubricant dispensing apparatus provided with a contact type dispensing nozzle, a movable thrust means therefor, for effecting the sealing contact between said nozzle and a nipple operatively associated therewith, a valve controlling the flow of lubricant through said nozzle adapted to be unseated responsive to movement of said thrust means, said thrust means comprising a portion exposed to pressure of lubricant in the apparatus opposing manually effected valve opening movement of said thrust means, the area of said portion of said means exposed to pressure of lubricant being so correlated to the areas of said nipple and nozzle enclosed within the line of sealing contact exerted therebetween, that in order to overcome the effect of pressure of lubricant pressure on said thrust means to move the thrust means sufficient manual pressure will have to be exerted on the nozzle to prevent leakage of lubricant between the nozzle and nipple by the separating effect of lubricant pressure on the said enclosed surfaces.

In testimony whereof I hereunto affix my signature this 22 day of April, 1930.

OSCAR U. ZERK.